US010650783B2

(12) United States Patent
Awad et al.

(10) Patent No.: US 10,650,783 B2
(45) Date of Patent: May 12, 2020

(54) TECHNIQUES FOR IMAGING A SCANNED OBJECT

(71) Applicant: VOTI INC., St-Laurent, Quebec (CA)

(72) Inventors: William Awad, St-Laurent (CA); Simon Archambault, St-Laurent (CA)

(73) Assignee: VOTI INC, St-Laurent, Quebec (CA)

( * ) Notice: Subject to any disclaimer, the term of this patent is extended or adjusted under 35 U.S.C. 154(b) by 0 days.

(21) Appl. No.: 16/014,393

(22) Filed: Jun. 21, 2018

(65) Prior Publication Data

US 2018/0315396 A1 Nov. 1, 2018

Related U.S. Application Data

(63) Continuation of application No. 15/028,362, filed as application No. PCT/CA2014/050981 on Oct. 9, 2014, now Pat. No. 10,089,956.

(60) Provisional application No. 61/888,816, filed on Oct. 9, 2013.

(51) Int. Cl.
*G06T 7/00* (2017.01)
*G09G 5/02* (2006.01)
*G06T 5/00* (2006.01)
*G06T 5/40* (2006.01)

(52) U.S. Cl.
CPC ............. *G09G 5/02* (2013.01); *G06T 5/009* (2013.01); *G06T 5/40* (2013.01); *G06T 7/0004* (2013.01); *G06T 2207/10116* (2013.01); *G06T 2207/30112* (2013.01)

(58) Field of Classification Search
CPC .. G09G 5/02; G06T 5/009; G06T 5/40; G06T 7/0004; G06T 2207/10072; G06T 2207/10116; G06T 2007/30112; G06T 2207/10081; G06T 2207/10088; G06N 23/06; G06N 23/2076
See application file for complete search history.

(56) References Cited

U.S. PATENT DOCUMENTS

| 10,089,956 | B2 * | 10/2018 | Awad | G06T 5/009 |
| 2012/0140879 | A1 * | 6/2012 | Gudmundson | G01N 23/04 378/53 |
| 2017/0371010 | A1 * | 12/2017 | Shanbhag | G01R 33/5608 |

* cited by examiner

*Primary Examiner* — Antonio A Caschera
(74) *Attorney, Agent, or Firm* — Hartman Global IP Law; Gary M. Hartman; Domenica N. S. Hartman

(57) ABSTRACT

A technique for enhancing an image includes manipulating a base image to highlight pixels showing a particular material based on the energy absorption information of each pixel. In another technique, pixels in a base image are each converted to an output value to produce a converted image. Another technique allows imaging an obstructed object within a base image which is made of pixels, each representing a captured signal from a source emitting a source signal $I_0$. An obstruction region contains pixels representing a combined signal $I_3$ having traversed the obstructed object and an obstructive layer. Knowing a layer signal $I_2$ representing a signal having traversed the obstructive layer outside of the obstruction region, the layer signal $I_2$ may be removed from the combined signal $I_3$, in order to reveal the original signal $I_1$ representing an image of the obstructed object.

16 Claims, 18 Drawing Sheets

TECHNIQUES FOR IMAGING A SCANNED OBJECT

This application is a continuation of U.S. Ser. No. 15/028,362 which was a National Stage Application of PCT/CA2014/050981, filed 9 Oct. 2014, which claims benefit of U.S. Provisional Patent Application Ser. No. 61/888,816, filed 9 Oct. 2013 and which applications are incorporated herein by reference. To the extent appropriate, a claim of priority is made to each of the above disclosed applications.

FIELD

The present relates to the field of image processing. More particularly, the present invention relates to a system and method for detecting a material in an object, to a system and method for enhancing a display of a base image of an object, and to a system and method for imaging an obstructed object in an image.

BACKGROUND OF THE INVENTION

Conventional scanning systems display images of a scanned object for an observer to view elements of the scanned object.

Given that the human eye is only able to distinguish a certain level of contrast in an image, especially in greyscale, there is a need for a system which displays images in an improved manner so as to help an observer better distinguish elements in an image of a scanned object.

Hence, in light of the aforementioned, there is a need for an improved system which, by virtue of its design and components, would be able to overcome some of the above-discussed prior art concerns.

SUMMARY OF THE INVENTION

An object of the present invention is to provide an improved image display system.

In accordance with an aspect, there is provided a method for detecting a material in an object. The method comprises: receiving, via an input port, a base image of the object comprising one or more material to be detected, the base image being composed of pixels, each pixel comprising energy absorption information; providing in a memory, one or more reference value, each representing an energy absorption of a reference material; transforming the base image, by means of a material detection module embedded in a processor, by highlighting each of said pixels of which the energy absorption information correlates with one of said reference material stored in the memory, based on a comparison of the energy absorption information of each pixel with said one or more reference value stored in the memory, in order to produce a detection-enhanced image; and displaying, on a display screen, the detection-enhanced image having highlighted pixels corresponding to said one or more material to be detected.

According to embodiments, the base image is generated by capturing a source emission, for example an X-Ray emission, having traversed the object and by converting said source emission to a pixel value. According to embodiments, each reference value is set for a given signal level of the source emission and the comparison between the energy absorption information of the pixel and the one or more reference value in the transforming step, takes into account the signal level. In some embodiments, the source emission to which the object is subjected to, corresponds to this signal level.

According to embodiments, the energy absorption information comprises an atomic number.

According to embodiments, the energy absorption information of each pixel comprises a low energy absorption component and a high energy absorption component. The low energy absorption and the high energy absorption components may be converted into a corresponding grey scale value for the pixel, representing the particular combination of low and high energy absorption. According to some embodiments, the reference value comprises a low energy reference value and a high energy reference value for each of said reference material, in which case the comparison between the energy absorption information of the pixel and the one or more reference value in the transforming step, comprises: comparing the low energy absorption information with the low energy reference value; and comparing the high energy absorption information with the high energy reference value. The low energy reference value and the low energy absorption information may correspond to an energy signal within a lower range spanning between about 10 kV to about 70 kV. The high energy reference value and the high energy absorption information may correspond to an energy signal within a higher range spanning between about 60 kV to about 250 kV. In some embodiments, the higher range may reach much higher values for example, up to about 6 MeV.

According to embodiments, the reference material is a particular metal.

According to embodiments, the reference values represent energy absorptions of a plurality of reference materials.

According to embodiments, the highlighting step comprises coloring the pixel to be highlighted in a contrasting color, in relation to other pixels in the detection-enhanced image.

According to embodiments, the method further comprises receiving, via a user input device, a requested material to be detected. In such embodiments, the reference material of the transforming step corresponds to the requested material, so as to highlight the pixels corresponding to the requested material in the detection-enhanced image of the object.

In accordance with another aspect, there is provided processor-readable storage medium for detecting a material in an object, the processor-readable product comprising data and instructions for execution by a processor, to execute steps of the above-mentioned method.

According to embodiments, the processor-readable storage medium is a non-transitory product.

In accordance with another aspect, there is provided a system for detecting a material in an object. The system comprises: an input port for receiving a base image of the object comprising one or more material to be detected, the base image being composed of pixels, each pixel comprising energy absorption information; a memory for providing one or more reference value, each representing an energy absorption of a reference material; a material detection module embedded in a processor, the processor being in communication with the input port and the memory, for transforming the base image by highlighting each of said pixels of which the energy absorption information correlates with one of said reference material stored in the memory, based on a comparison of the energy absorption information of each pixel with said one or more reference value stored in the memory, in order to produce a detection-enhanced image; and a display screen being in communication with the processor, for displaying the detection-enhanced image having highlighted pixels corresponding to said one or more material to be detected.

In accordance with yet another aspect, there is provided a method of enhancing a display of a base image of an object. The method comprises receiving, via an input port, a base image comprising pixels, each pixel having an intensity value; providing in a memory, one or more reference intensity, each being associated to an output value; transforming the base image, by means of a conversion module embedded in a processor, to convert pixels of the base image into to the associated output values, by correlating the intensity value of each pixel with said one or more reference intensity stored in the memory, to produce a converted image; and displaying the converted image, on a display screen.

According to an embodiment, the intensity value of the receiving step represents an intensity level within a monochromatic scale. The reference intensity(s) stored in the memory comprises ranges of the monochromatic scale, wherein the output value stored comprises an output color for each range. The transforming comprises converting each pixel from said monochromatic scale to a corresponding one of said output color, such that the converted image is a color-mapped image. In such embodiments, each range of the monochromatic scale may be associated to a spectrum of color, and the output value may be selected by correlating a position of the intensity value of the pixel within said range, with a corresponding position within said spectrum of color. In addition, each range of the monochromatic scale stored in the memory may be associated to a distinct color. Further, adjacent ranges of the monochromatic scale stored in the memory may correspond to contrasting colors.

According to embodiments, the transforming further comprises defining a region of interest in the base image, and wherein the pixels of the converting step are within the region of interest. The region of interest includes to the entire base image or a portion or portions of the base image. In such embodiments, the transforming further comprises prior to the converting step: defining a scale of intensity values including the intensity values of the pixels in the region of interest; and stretching said scale by applying a multiplying factor to the intensity values of said pixels in the region of interest, in order to enhance variations of in the intensity values of the pixels within the region of interest. The region of interest may be defined based on a user selection received. Alternatively, the region of interest may be defined by identifying, by means of the processor, a region in the base image containing pixels which exceeds a threshold intensity. The threshold intensity may be set to define the region of interest to include portions of the image having a predetermined number of pixels having a low intensity value.

According to embodiments, the transforming and displaying steps are repeated for a plurality of iterations, in order to modify the displayed image within a period of time. For example, the method may further comprise: defining, at a first iteration, a first section comprising the pixels of the converting step of said first iteration; and at a second iteration, defining a second section comprising the pixels of the converting step of said second iteration. The second section may correspond to a section adjacent to the first section within the base image. In another example, the method further comprises: at a first iteration, prior to the converting step: defining a first threshold of intensity, filtering out pixels having an intensity value which exceeds said first threshold to keep only unfiltered pixels of the first iteration, and multiplying the intensity values of the unfiltered pixels by a factor; and at a second iteration, prior to the converting step: defining a second threshold of intensity different from said first threshold, filtering out pixels having an intensity value which exceeds said second threshold to keep only unfiltered pixels of the second iteration, and multiplying the intensity values of the unfiltered pixels by said factor.

According to embodiments, the output value associated to the one or more reference intensity is further changed between successive iterations. The output value may be selected from a color scheme changing over a time period. The color scheme may further transition periodically in sine waves.

According to embodiments, the intensity value of each pixel represents a signal intensity of the object having been subjected to a source emission. The signal intensity may correspond to an energy absorption. The source emission may be an X-Ray source.

In accordance with another aspect, there is provided a processor-readable storage medium for enhancing a display of a base image of an object, the processor-readable product comprising data and instructions for execution by a processor, to execute steps of the above-mentioned method. The processor-readable storage medium may be a non-transitory product.

In accordance with another aspect, there is provided a system for enhancing a display of a base image of an object. The system comprises an input port for receiving a base image comprising pixels, each pixel having an intensity value; a memory for providing one or more reference intensity, each being associated to an output value; a conversion module embedded in a processor, the processor being in communication with the input port and the memory for transforming the base image in order to convert pixels of the base image into to the associated output values, by correlating the intensity value of each pixel with said one or more reference intensity stored in the memory, and to produce a converted image; and a display screen displaying the converted image.

In accordance with still another aspect, there is provided method of imaging an obstructed object in an image. The method comprises: receiving, via an input port, a base image comprising pixels, each representing a captured signal from a source emitting a source signal $I_0$; locating, by means of a locating module embedded in a processor, a region of interest in the base image wherein the pixels represent a combined signal $I_3$ having traversed the obstructed object and said obstructive layer; providing, in a memory, a layer signal $I_2$ representing a signal having traversed the obstructive layer outside of said region of interest; isolating, by means of a calculator embedded in the processor, an original signal in said region of interest, by removing for each pixel in said region of interest, the layer signal $I_2$ from the combined signal $I_3$, on the basis of said source signal $I_0$, the resulting original signal $I_1$ representing an image of the obstructed object; and displaying on a display screen, a resulting image from said original signals wherein the region of interest reveals the obstructed object. The source signal may be sourced from an X-Ray emission.

According to embodiments, the isolating step is based on the Beer-Lambert Law. More particularly, the original signal $I_1$ is obtained according to the following equation:

$$I_1 = (I_3 \cdot I_0)/I_2 = \frac{I_0^2(e^{-\mu_1 t_1} \cdot e^{-\mu_2 t_2})}{I_0 e^{-\mu_2 t_2}} = I_0 e^{-\mu_1 t_1}$$

wherein $I_1 = I_0 e^{-\mu_1 t_1}$, where $\mu_1$ represents an attenuation coefficient of the obstructed object and $t_1$ represents a thickness of the obstructed object; and wherein $I_2 = I_0 e^{-\mu_2 t_2}$, where $\mu_2$ represents an attenuation coefficient of the obstructive layer and $t_2$ represents a thickness of the obstructive layer.

According to embodiments, the source signal $I_0$ represents a low energy component of a source signal, wherein the layer signal $I_2$ represents a low energy component of the signal having traversed the obstructive layer outside of said region of interest, wherein the combined signal $I_3$ represents a low energy component of the signal having traversed the obstructed object and said obstructive layer, and wherein the resulting original signals $I_1$ represents a low energy component of a signal representing the obstructed object when unobstructed.

According to embodiments, the source signal $I_0$ represents a high energy component of a source signal, wherein the layer signal $I_2$ represents a high energy component of the signal having traversed the obstructive layer outside of said region of interest, wherein the combined signal $I_3$ represents a high energy component of the signal having traversed the obstructed object and said obstructive layer, and wherein the resulting original signals $I_1$ represents a high energy component of a signal representing the obstructed object when unobstructed.

In accordance with another aspect, there is provided a processor-readable storage medium for imaging an obstructed object in an image, the processor-readable product comprising data and instructions for execution by a processor, to execute steps of the above-mentioned method.

According to an embodiment, the processor-readable storage medium is a non-transitory product.

In accordance with another aspect, there is provided a system for imaging an obstructed object in an image. The system comprises: an input port for receiving a base image comprising pixels, each representing a captured signal from a source emitting a source signal $I_0$; a locating module embedded in a processor, the processor being in communication with the input port for locating a region of interest in the base image wherein the pixels represent a combined signal $I_3$ having traversed the obstructed object and said obstructive layer; a memory for providing a layer signal $I_2$ representing a signal having traversed the obstructive layer outside of said region of interest; a calculator embedded in the processor, for isolating an original signal $I_1$ in said region of interest, by removing for each pixel in said region of interest, the layer signal $I_2$ from the combined signal $I_3$, on the basis of said source signal $I_0$, the resulting original signal $I_1$ representing an image of the obstructed object; and a display screen for displaying a resulting image from said original signals $I_1$, wherein the region of interest reveals the obstructed object.

The objects, advantages and features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

In the following description, the same numerical references refer to similar elements. The embodiments mentioned and/or geometrical configurations and dimensions shown in the figures or described in the present description are embodiments of the present invention only, given for exemplification purposes only.

Broadly described, the image display system according to a particular embodiment of the present invention, as exemplified in the accompanying drawings, provides a base image from which information is extracted in order to display it in a desired format, so as to enhance the visual experience of an observer.

Figure 1:
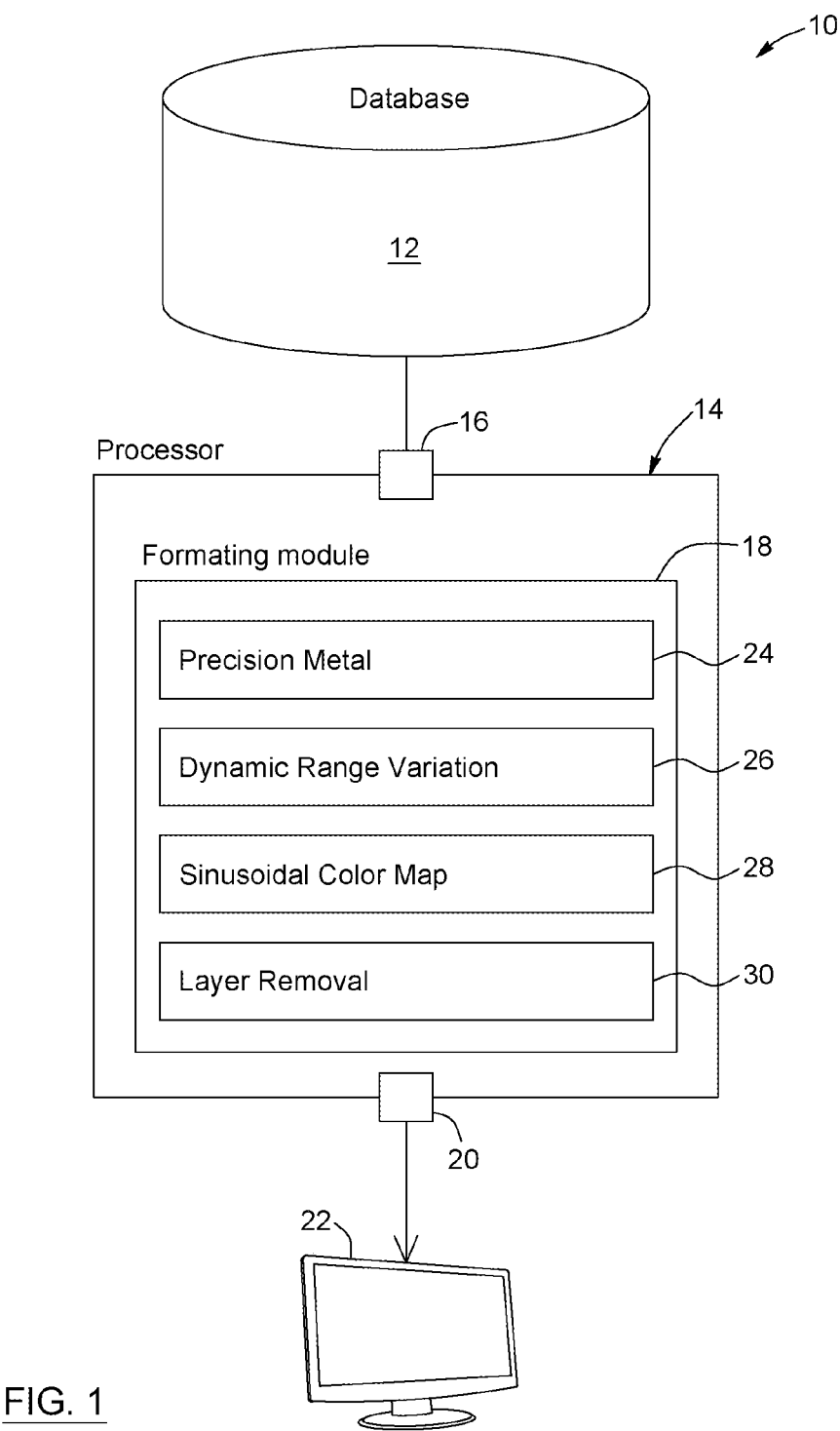
FIG. 1 is a schematic representation of the image display system, according to an embodiment of the present invention.

In accordance with an embodiment, as better illustrated in FIG. 1, there is provided an image display system 10 comprising:

a storage 12 for storing a base image of a scanned object, the base image being composed of pixels each having a display value, which may correspond to a greyscale or color value;

an input/output port 16, at a processor 14, for receiving the base image and a display format selection;

a formatting module 18, integrated in the processor 14, for formatting the image according to the display format selection;

an input/output port 20 at the processor 14 for transmitting a formatted image to be displayed; and a display 22, integrated in a user interface, for displaying a formatted image, in order to provide a better distinction in elements constituting the scanned object.

Base Image

In accordance with an embodiment of the present invention, the base image is generated by scanning an object using X-Ray radiation.

More particularly, a source emits electromagnetic (or EM) radiation, such as X-rays, toward an object. The emission of the EM radiation may be performed continuously, at discrete intervals, or only as the object displaced in relation to the source. Detectors located opposite the object, in relation to the source, capture X-ray signal having traversed the object. The signal captured at each point of a detector, depending on the density and thickness of the material having by traversed by the X-ray emission.

According to the present embodiment, the X-Ray source emits a continuous spectrum of X-Rays, ranging from a lower energy range such as 10 to 70 kV (+/−) up to higher energy ranges such as 60 to 250 kV (+/−).

It is to be understood that depending on particular embodiments of the present invention, the lower energy range may be as low as 1 kV and the higher energy ranges may be greater that the values given above in relation to the described embodiment.

As previously mentioned, the detectors capture the X-ray energy that traverses the object as it is subjected to the X-rays. The detector comprises a first scintillator which detects a lower portion of an X-Ray signal, filter for filtering residual low range signal, and a second scintillator which detects a higher portion of the X-Ray signal. The high energy range penetrates more easily through denser materials, while the low energy range provides better contrast for image portions corresponding to lighter materials.

Each of the scintillators converts the X-Ray energy to light. Each detector further comprises a photo-diode connected to each scintillator in order to convert the light into an electric signal. The electric signal is further digitized by a converter. The digitized value is associated to a pixel of the image which represents the object.

Some error may occur in the photo-diodes' conversion of the light into an electric signal. Indeed, a given light source may result in different electrical signals due to the fact that every detector card may behave slightly differently to the presence or absence of X-Ray signal, in comparison to another detector card. This error, typically offset and gain, is corrected in order to produce a more homogenous image.

The high and low energy information is then fused, so that each pixel of the image results from a combination of high energy data in some proportion and low energy data in some proportion. Depending on the density of the material detected, it may be desirable to emphasize the low energy information or the high energy information in suitable proportion. Indeed, as previously mentioned, the high energy range penetrates more easily through denser materials, while the low energy range provides better contrast for image portions corresponding to lighter materials. The high and low energy data is thus combined accordingly to better illustrate particular regions of the image. For example, a pixel may be the result of 25% of the high energy data and 75% of the low energy data because it is determined by the X-Ray signal is relatively high, meaning that it is more desirable to see contrast. The proportion of high and low energy is determined based on ranges of low energy data value and/or high energy data value for a particular pixel.

The resulting pixel value (or signal at the pixel) is translated to a corresponding grey scale value, so as to provide a resulting image of the scanned object. For example, a very low pixel value may tend to appear dark grey or black, while a very high pixel value may tend to appear white or light grey. All medium pixel values are translated to corresponding levels of grey ranging between light and dark greys.

The image may be further sharpened and/or variations therein may be corrected.

The base image is then stored in the storage 12 and ready to be displayed on the display screen 22. The base image may be displayed in various formats, via the following formatting modules, shown in FIG. 1: a precious metal detection module 24, a dynamic range variation module 26, a sinusoidal color map module 28, and a layer removal module 30. Each of these modules will now be described more specifically.

Precious Metal Detection and Related Features

A first display format is provided by a precious metal detection module 24, on the basis of an atomic number associated to each pixel of the base image.

An atomic number is determined based on the low energy absorption data and high energy absorption data for a given pixel, as well as a signal level of a source emission. The atomic numbers are thus referenced to specific combinations of low and high energy absorption levels, for a source signal level, in a reference table. Each atomic number is further associated to a specific material. The afore-mentioned high and low energy date associated to each pixel is thus correlated, based on this reference table, to a type of material having been scanned at the corresponding pixel.

Upon displaying the image, a user of the system enters a command which specifies one or more type(s) of metal to be observed. Each pixel being associated to an atomic number corresponding to each of the specified type(s) is displayed within the image in a high-contrasting tone or color in order to highlight areas in the image corresponding to elements made of the specified type(s) of metals.

Figure 2:
FIG. 2 shows the contents of a suitcase to be scanned, in the context of a precious metal detection module within the system shown in FIG. 1.
Figure 3:
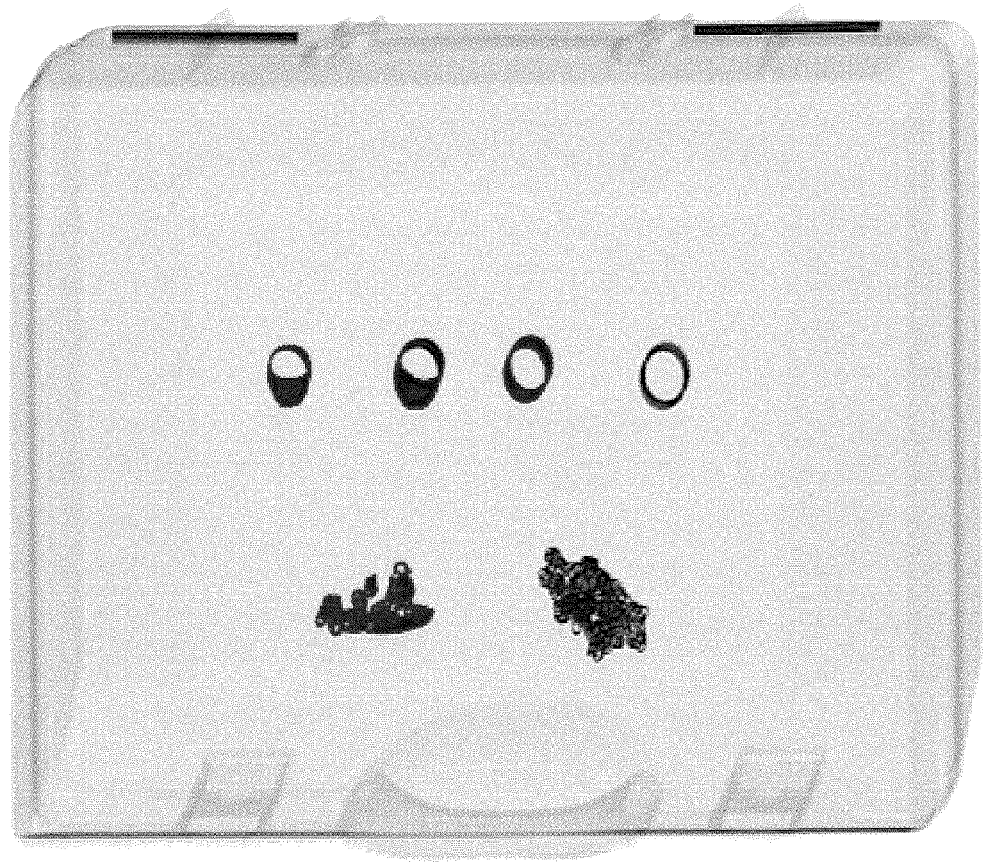
FIG. 3 is a scan image of the suitcase shown in FIG. 2.
Figure 4:
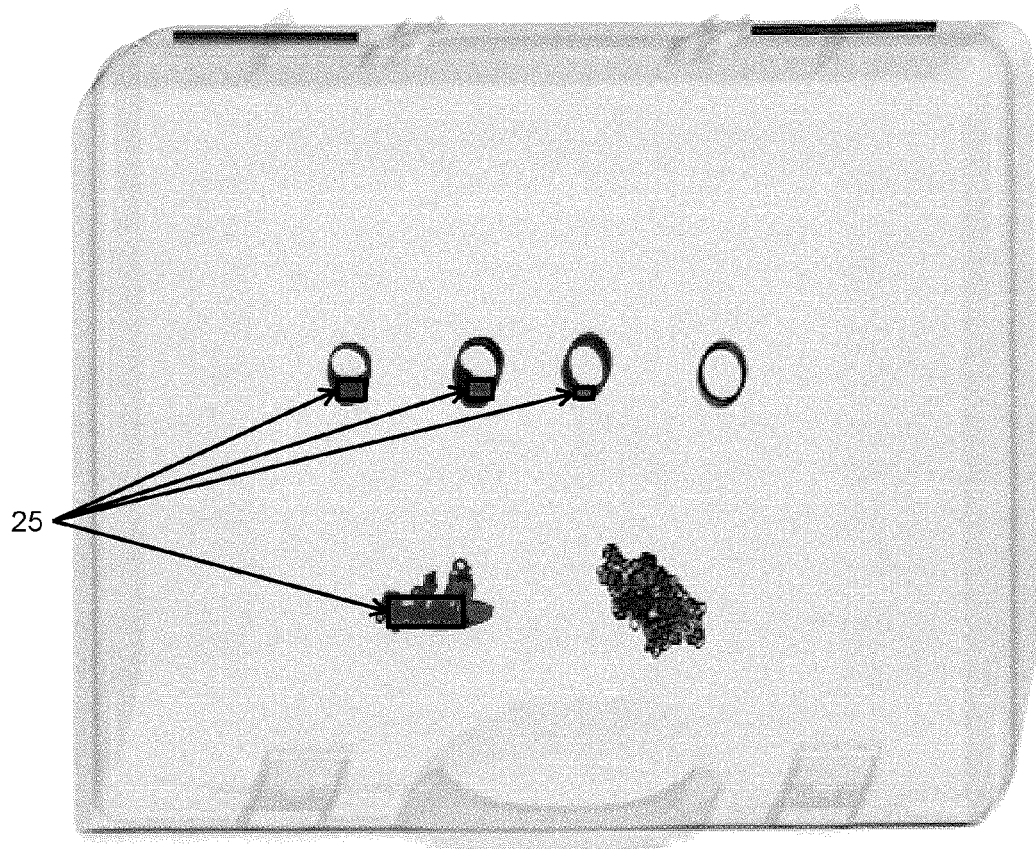
FIG. 4 shows the scan image of FIG. 3, when the precious metal detection module is activated.

FIGS. 2 to 4 illustrate the operation of the precious metal detection module 24 (see FIG. 1). Namely, FIG. 2 shows the contents of a suitcase which is scanned by an X-ray scanner. FIG. 3 shows the scanned suitcase. FIG. 4 shows the scanned suitcase when the precious metal detection module 24 is activated, wherein areas 25 where precious metal is detected is highlighted.

Thus, using different wording, there is provided in accordance with an embodiment, a method for detecting a material in an object. The method comprises a step of receiving, via an input port (20 or 16), a base image of the object comprising one or more material to be detected, the base image being composed of pixels, each pixel comprising energy absorption information. In another step, there is provided in a memory (for example, in database 12), one or more reference value, each representing an energy absorption of a reference material. In another step, the base image is transformed, by means of a material detection module (such as precision metal module 24, for example) embedded in a processor 14, by highlighting each of said pixels of which the energy absorption information correlates with one of said reference material stored in the memory (for example in database 12), based on a comparison of the energy absorption information of each pixel with said one or more reference value stored in the memory, in order to produce a detection-enhanced image. In another step, the detection-enhanced image is displayed on the display screen 22, showing highlighted pixels corresponding to said one or more material to be detected.

The energy absorption information of any given pixel of the base image corresponds to a signal level from a source emission (for example X-Ray source emission), and may comprise an atomic number which comprises a low energy absorption component and high energy absorption component, which are in turn converted into a corresponding grey scale value for the pixel. Accordingly, the reference value(s) stored in memory, comprises a low energy reference value and a high energy reference value for each reference material, and the comparison between the energy absorption information of the pixel and the reference value(s) is made between the low energy absorption information and the low energy reference value; and between the high energy absorption information and the high energy reference value, respectively.

Dynamic Range Variation and Related Features

Figure 10:
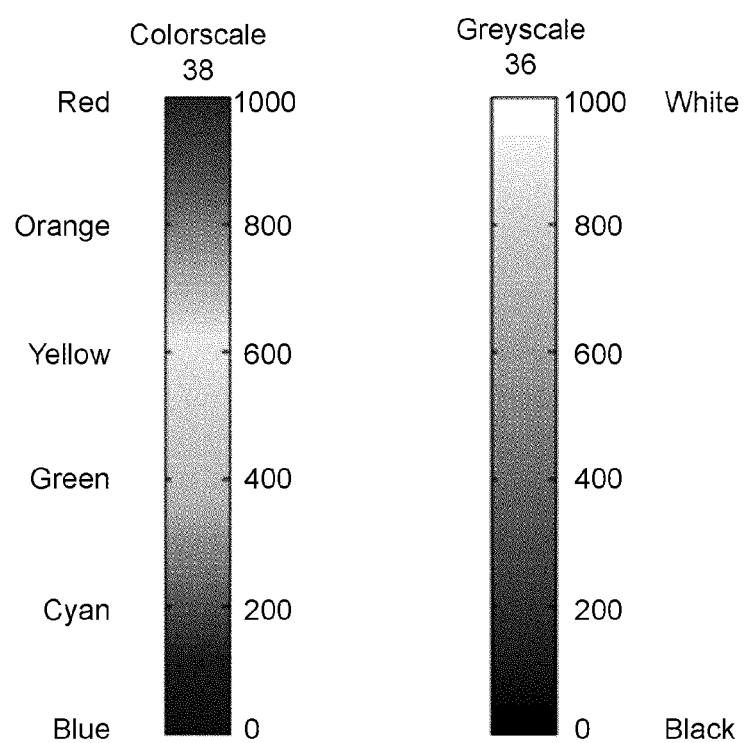
FIG. 10 is a diagram showing the color conversion of the dynamic range variation module.

The Dynamic range variation module 26 provides a display format where greyscale signals are converted to a display color, in order to better distinguish features in the displayed image. More particularly, various ranges of grey scale are translated to color ranges of contrasting color. Thus, a first range of grey scale 36 may extend from white to very light grey, which would be converted to a spectrum 38 of reds (ranging from dark red to orange), another range of grey scale may extend from light grey to a medium grey, which may be converted to a spectrum of yellow to green colors (ranging from orange-yellow to bright green), and so on an so forth, as schematically represented in FIG. 10.

It is to be understood that in accordance with alternate embodiments, the histogram stretching may be provided in various other color schemes (for example, black and white only, etc).

Moreover, the image may be further enhanced by providing a different dynamic range on specific areas of the displayed image. Thus, upon receiving a user selection of a region on the base image to enhance, the dynamic range variation module 26, defines a new set of color spectrums to correspond to narrower pixel values of the selected region, as will be better explained further below with reference to FIG. 13A to 13D.

More particularly, the dynamic range variation feature is used to better view low signal regions of the image. These low signal regions are the result of the presence of high attenuation materials in the scanned object. In x-ray physics, it is well known that attenuation is a combination of thickness and density: a thin layer of dense material can yield the same attenuation as a thick layer of light material. However, thick layers of light material are uncommon in most cases.

To make the low signal regions more visible, the dynamic range of the image is modified. This enhances the variation of the signal level in the lower signal portion. Only the high energy data is considered, since it is less attenuated by dense material.

Figure 5:
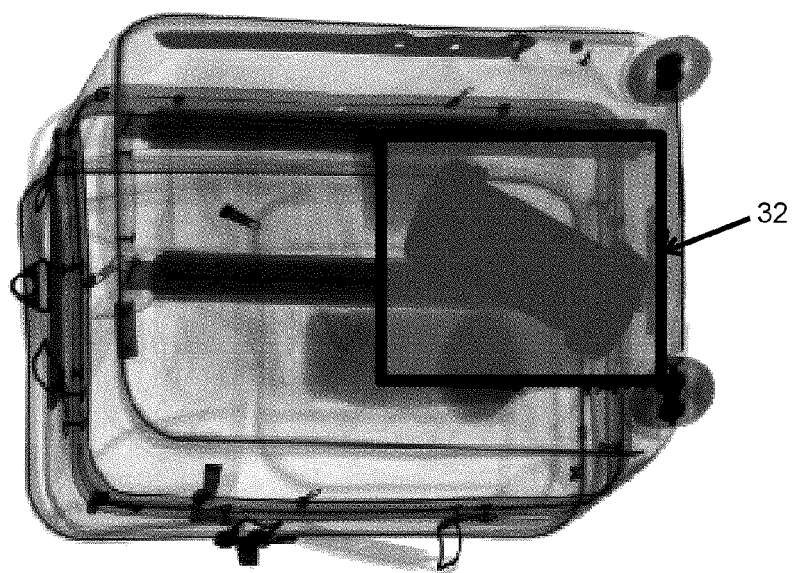
FIG. 5 is an image of an object having been scanned by the scanning system, according to an embodiment of the present invention.
Figure 6:
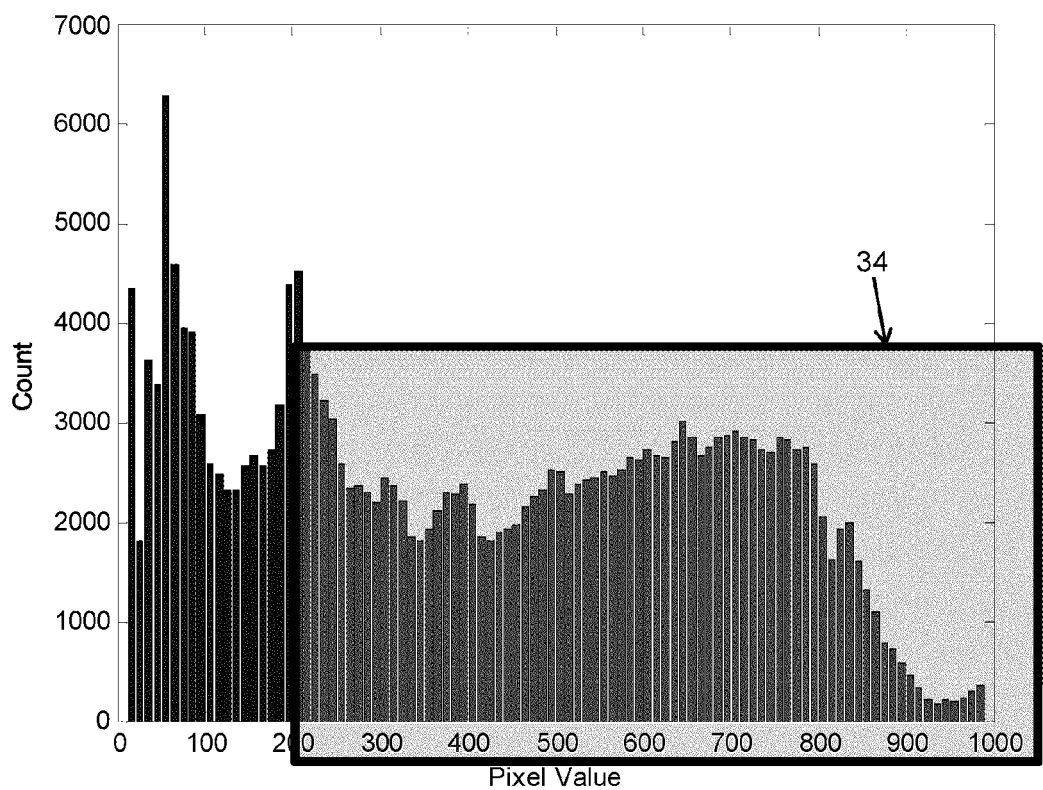
FIG. 6 is a histogram of the image shown in FIG. 5.
Figure 7:
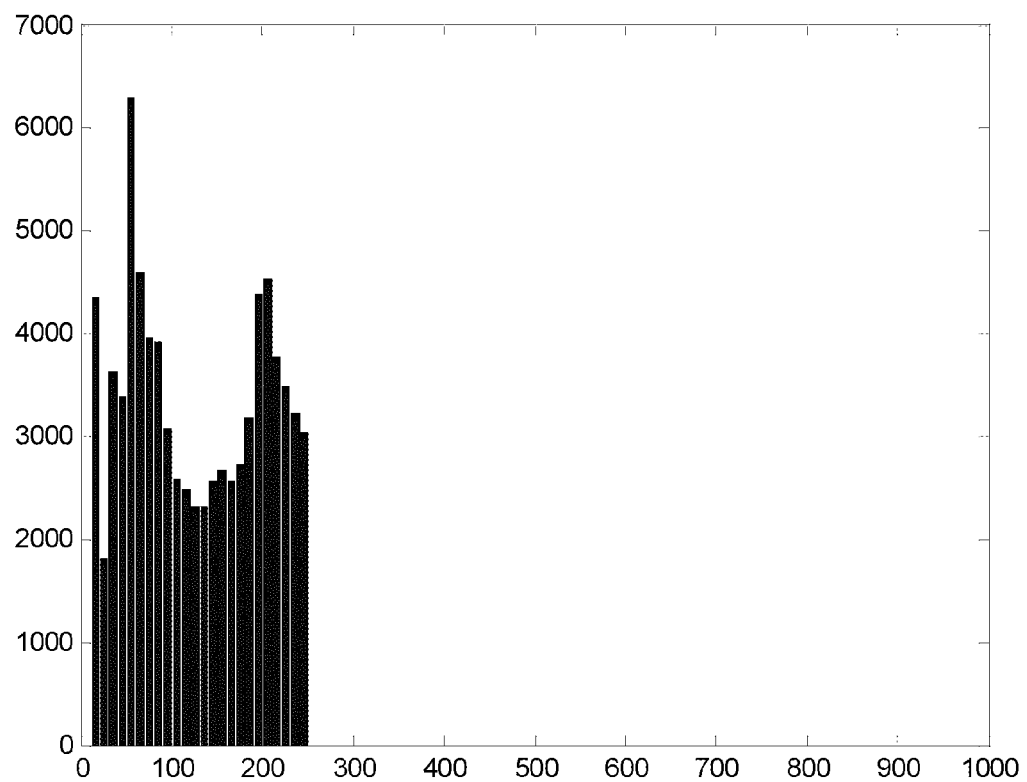
FIG. 7 is the histogram of FIG. 6, after cancellation of some of the signal by the dynamic range variation module of the system shown in FIG. 1.
Figure 8:
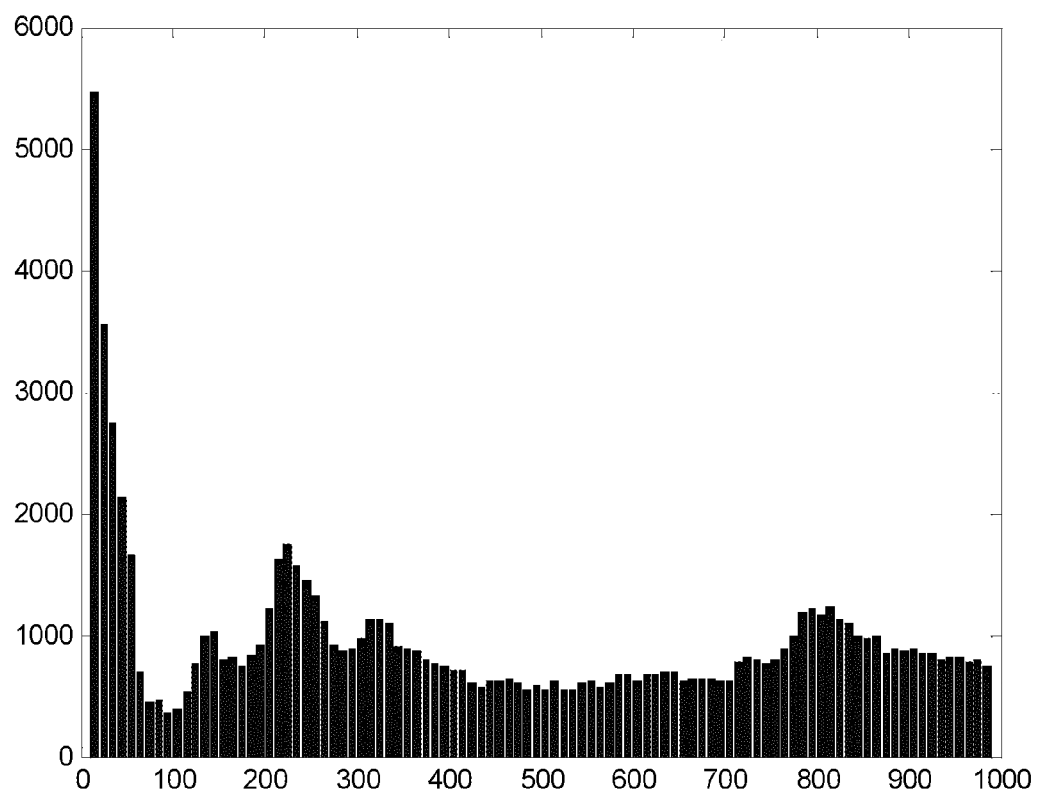
FIG. 8 is a histogram of FIG. 7, after stretching the remaining signal by the dynamic range variation module of the system shown in FIG. 1.
Figure 9:
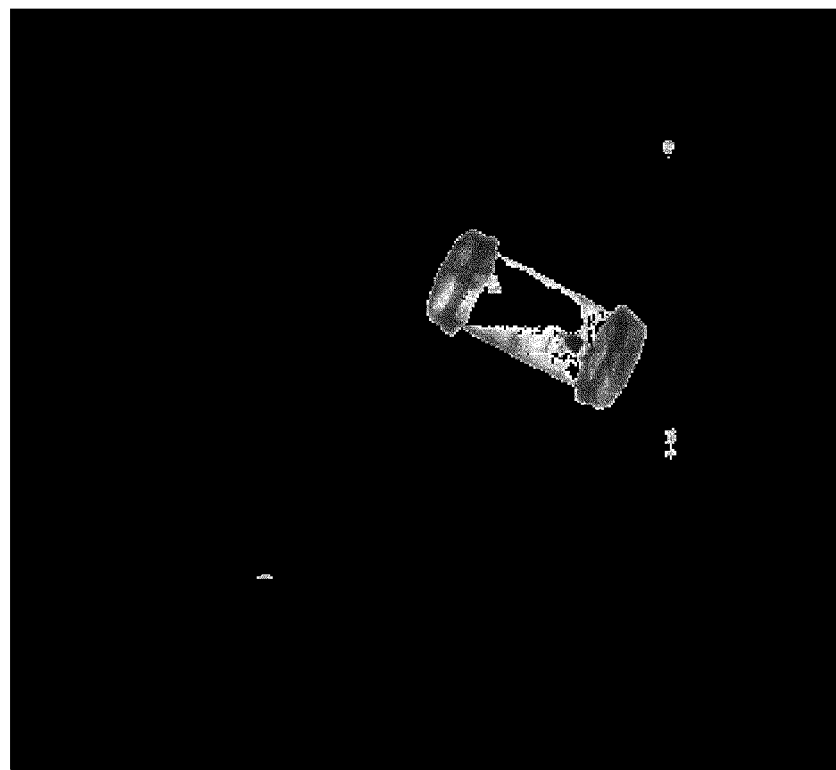
FIG. 9 is a version of the image shown in FIG. 5, after the stretching of the signal by the dynamic range variation module.

Referring to FIG. 5, there is shown a high attenuation region 32 for which it is desirable to gain more information about. A histogram of the image is presented in FIG. 6. As can be seen, the image is cluttered with undesirable information 34. All this data is set to zero, as depicted in FIG. 7. Then, the signal levels of the remaining data is stretched so that the whole dynamic range of the image is kept, by multiplying the signal level of the unaffected region, as represented in FIG. 8. The resulting image is shown in FIG. 9.

Referring to FIG. 10, the afore-mentioned color map further perceptually enhances the signal variation. The black and white colors are mapped to the color map. The colors range from blue to red, with intermediate colors including cyan, yellow, and orange.

Figure 11:
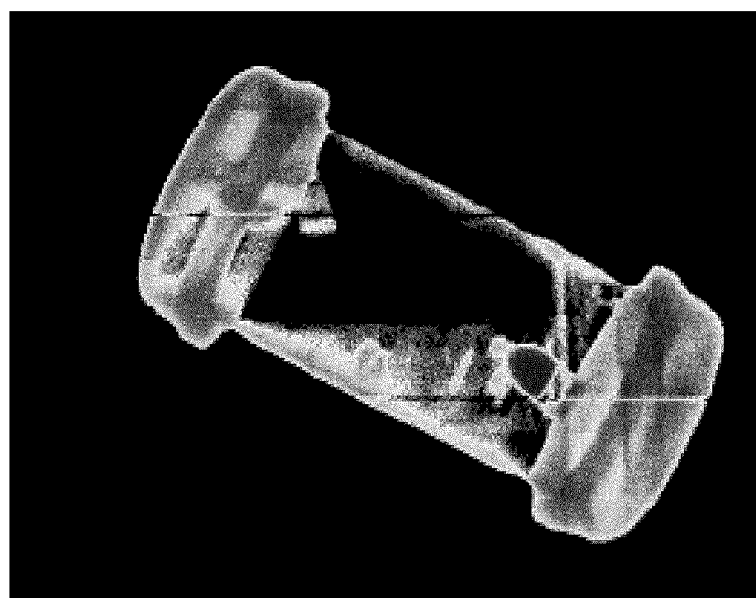
FIG. 11 is an image generated by the dynamic range variation module, from the basis of the image shown in FIG. 5.

The resulting image displayed is presented in FIG. 11.

On the basis of this image, a sweeping function further enhances the observer's experience.

Figure 12A:
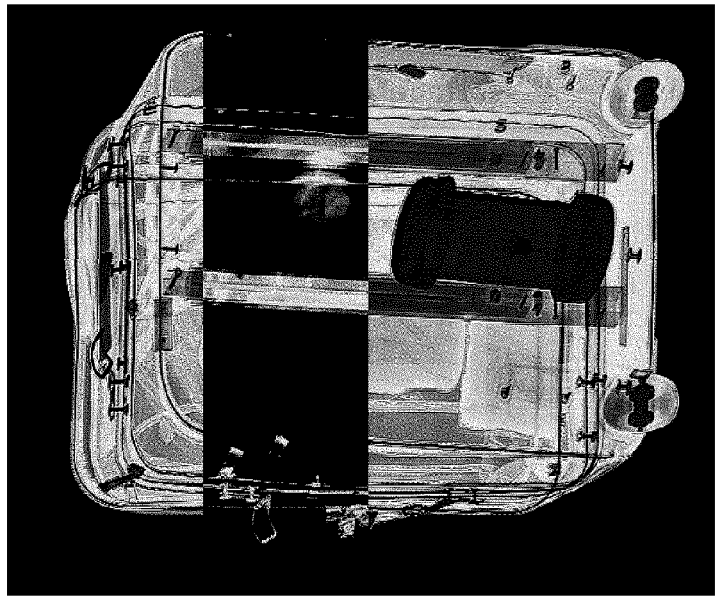
FIGS. 12A and 12B show steps during a first sweeping display mode of the dynamic range variation module.
Figure 12B:
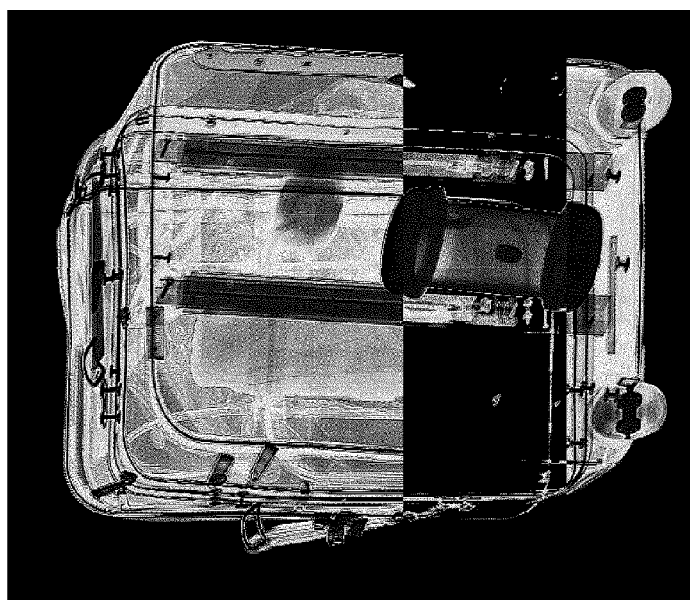
Figure 13A:
FIG. 13A to 13D shows steps during a second sweeping display mode of the dynamic range variation module.
Figure 13B:
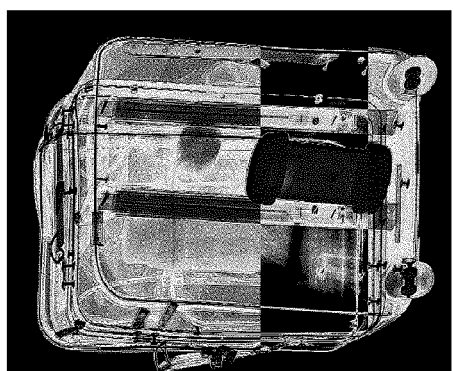
Figure 13C:
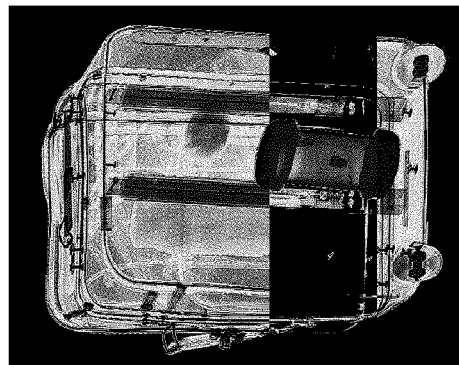
Figure 13D:
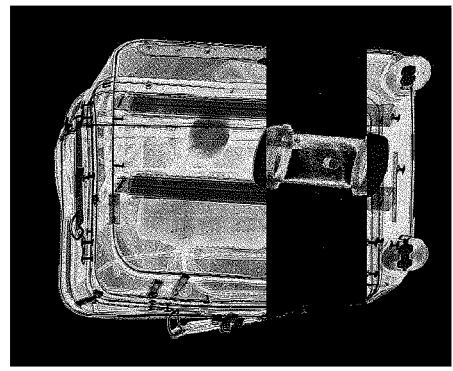

According to a first sweeping mode, illustrated in FIG. 12A and 12B, a periodic lateral sweep of the image, allows the user to analyze different sections of the image with and without the enhancement. FIG. 12A is a screenshot produced by the dynamic variation module at a given time, while FIG. 12B is another screenshot produced at a later time.

Figure 14:
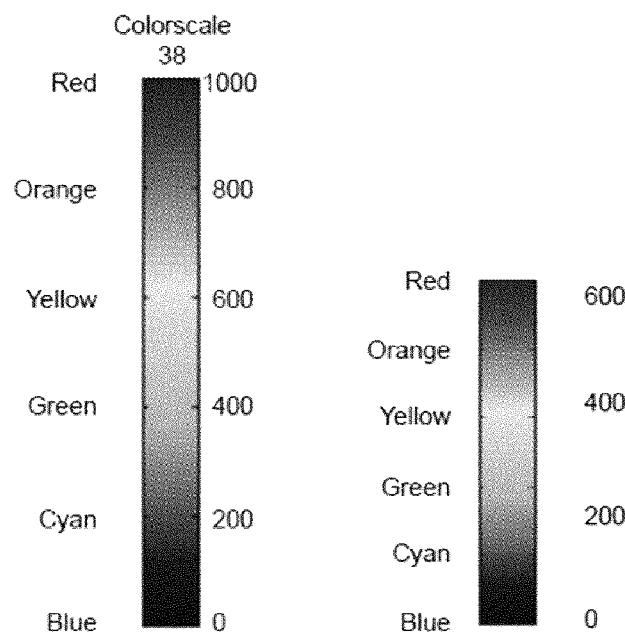
FIG. 14 is a diagram showing a conversion of the dynamic range variation module in a grey scale, according to an alternate embodiment.
Figure 15:
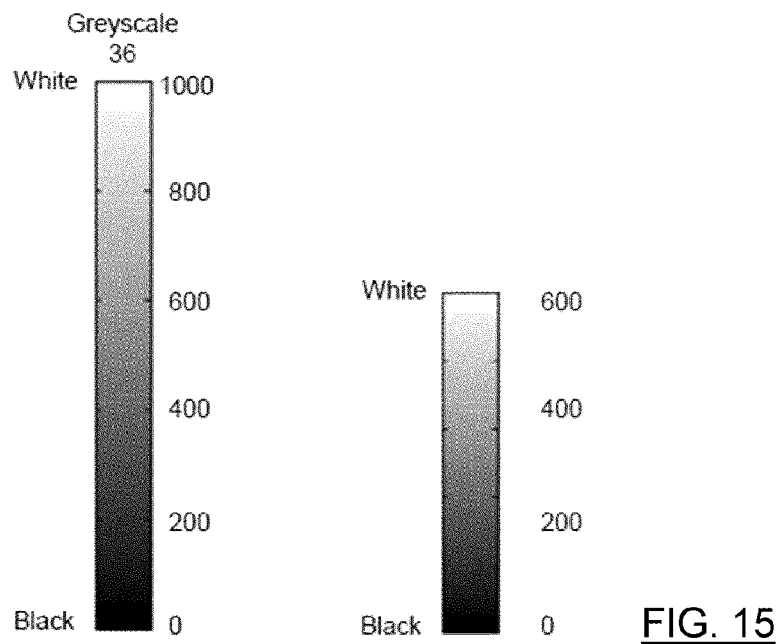
FIG. 15 is a diagram showing a conversion of the dynamic range variation module, according to another alternate embodiment.
Figure 16A:
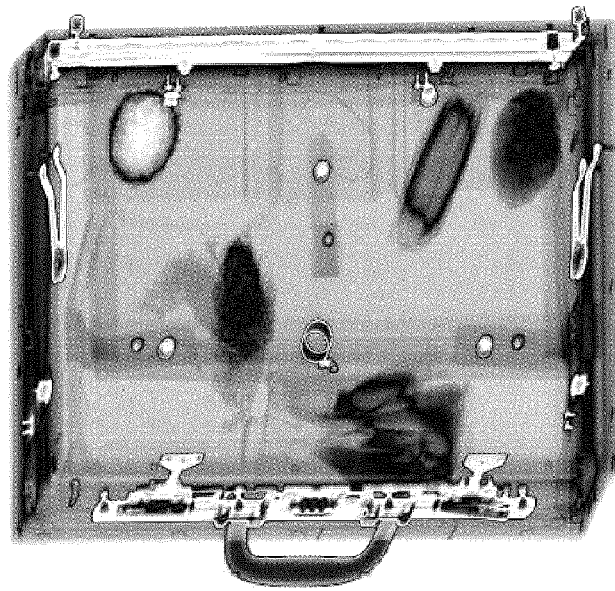
FIG. 16A to 16D show different screen captures illustrating the operation of the sinusoidal color map module of FIG. 1.
Figure 16B:
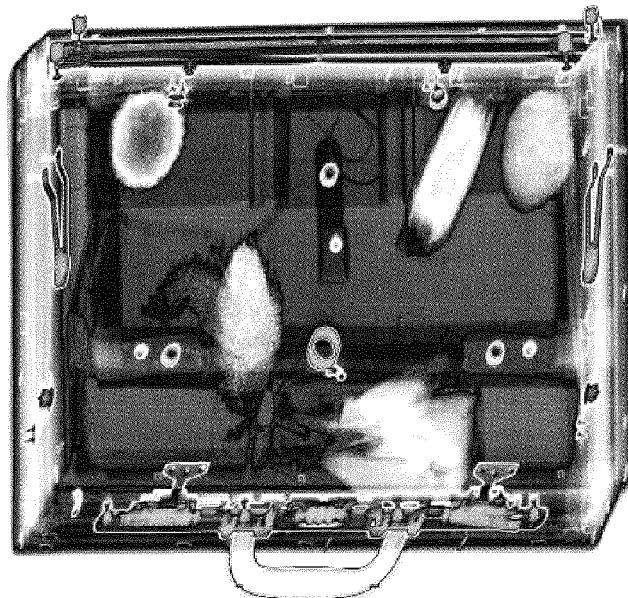
Figure 16C:
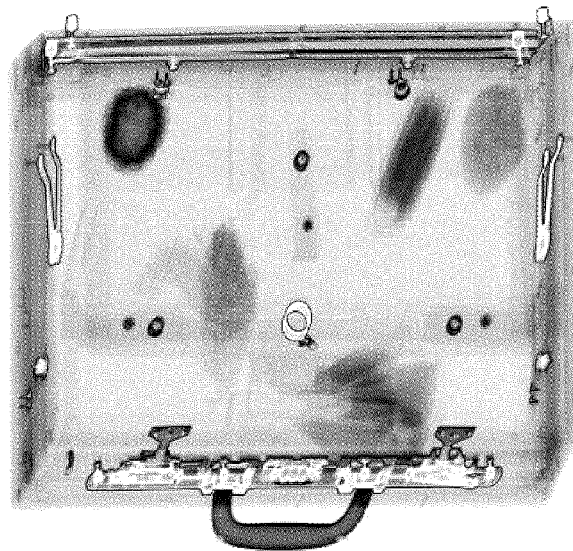
Figure 16D:
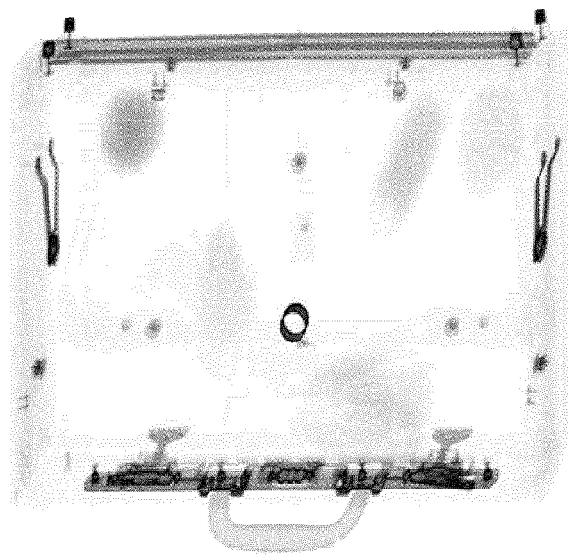

According to a second sweeping mode, illustrated in FIG. 13A to 13D, there is provided a dynamic range sweep of a particular region of the image. FIG. 13A to 13D show different screen captures taken at different times of a sweep, according to this mode. An upper limit of the signal level is gradually changed within a period of time, such that the histogram is gradually stretched to progressively reveal the low attenuation regions. The entire dynamic range is considered, in that the image is completely shown at one end of the sweep (i.e. the whole range is displayed (0 up to a maximum value)), while nothing is shown at the opposite end (only values from 0 to 1 are displayed). As exemplified in FIG. 14, in a grey scale ranging from 0 to 1000, pixels beyond 600 are cancelled and the remaining pixels are re-scaled in a grey scale range extending from 0 up to 600. Similarly, as exemplified in FIG. 15, the same may be done for a color scale, which allows variations to be more easily perceived by the human eye.

The Sinusoidal color map module 28 (see FIG. 1) provides a display format where greyscale signals are converted to a changing color scheme. Thus, regions of the image, each defined by their pixel signal value (range of grey) will be associated to its own changing color scheme which transitions periodically in sine waves.

Advantageously, variations in the pixel signals are further enhanced. Thus, the regions of the image displayed remains static, the colors of each region change, so as to help better distinguish elements of the image.

A further advantage is that some materials which would otherwise appear very similar, for examples organic materials such as tobacco and soap, may be better distinguishable to the human eye, through this type of display by enhancing subtle variations in the texture of each of those materials.

FIG. 16A to 16D show different screen captures illustrating the operation of the sinusoidal color map module 28. Each screen capture was taken at a different time during a cycle of the sinusoidal color map feature by which different portions of the image are enhanced.

Thus, using different wording, there is provided in accordance with an embodiment, a method for enhancing a display of a base image of an object. The method comprises a step of receiving, via an input port (16 or 20), a base image comprising pixels. Each pixel has an intensity value. In another step, there is provided in a memory, reference intensity(ies), each being associated to an output value. The base image is transformed, by means of a conversion module embedded in a processor (for example Dynamic range variation module 26 or sinusoidal color map module 28), to convert pixels of the base image into to the associated output values, by correlating the intensity value of each pixel with said reference intensity(ies) stored in the memory, to produce a converted image. The converted image is then displayed on a display screen 22.

In one alternative for colour mapping, the intensity value of the receiving step represents an intensity level within a monochromatic scale. The reference intensity(ies) stored in the memory comprises ranges of the monochromatic scale. The output value stored comprises an output color for each range. The transforming step further comprises converting each pixel from the monochromatic scale to a corresponding one of said output color, such that the converted image is a color-mapped image. Each range of the monochromatic scale may be associated to a spectrum of color, the output value being selected by correlating a position of the intensity value of the pixel within the monochromatic range, with a corresponding position within the color spectrum. Each range of the monochromatic scale may be associated to a distinct color. The monochromatic scale stored in the memory may further correspond to contrasting colors.

In another alternative for histogram stretching, the transforming step includes prior to the converting step: defining a scale of intensity values including the intensity values of the pixels within a region of interest (a portion or portions of the base image, or the entire base image); and stretching said scale by applying a multiplying factor to the intensity values of said pixels in the region of interest, in order to enhance variations in the intensity values of the pixels within the region of interest.

In another alternative, the transforming and displaying steps are repeated for a plurality of iterations, in order to modify the displayed image within a period of time (for example, for sweeping or sinusoidal color map features).

Layer Removal and Related Features

Figure 17:
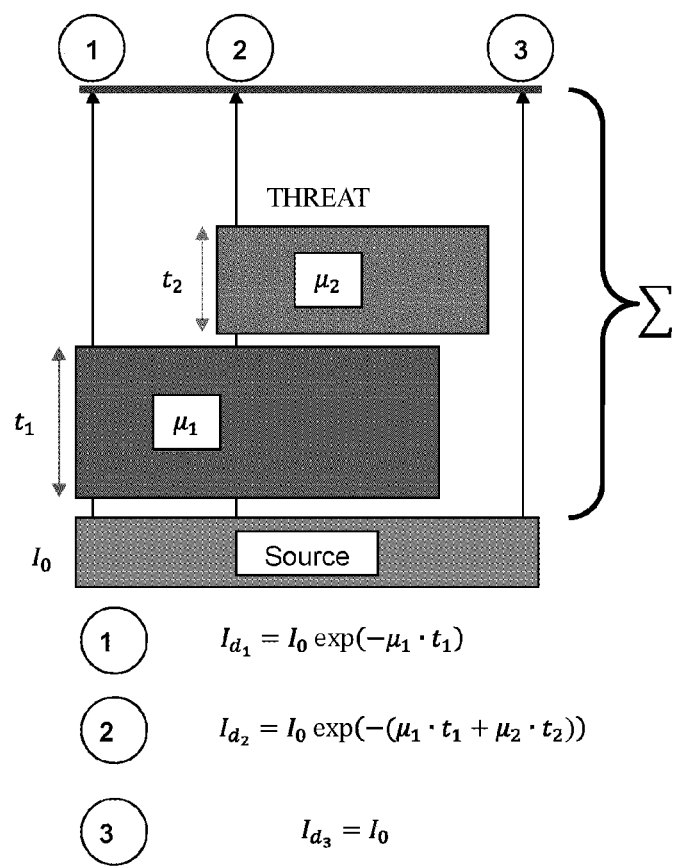
FIG. 17 is a diagram showing a Beer-Lambert law theorem applied by the layer removal module of the system shown in FIG. 1.

The layer removal module 30 (see FIG. 1) allows allows to strip the image of a homogeneous layer of material in a selected region. In order to achieve this, the signal obtained at the detector level follows a Beer-Lambert law as depicted in FIG. 17.

An original signal only going through an object is represented by:

$$I_1 = I_0 e^{-\mu_1 t_1}$$

The signal from a threat object is represented by, i.e. the homogeneous layer of material:

$$I_2 = I_0 e^{-\mu_2 t_2}$$

The desired combined signal is obtained by multiplying the original signal with the signal from the threat itself, then dividing by the source signal $I_0$:

$$I_3 = \frac{I_1 I_2}{I_0} = \frac{I_0 e^{-\mu_1 t_1} \cdot I_0 e^{-\mu_2 t_2}}{I_0} = \frac{I_0^2 (e^{-\mu_1 t_1} \cdot e^{-\mu_2 t_2})}{I_0} = I_0 e^{-\mu_1 t_1 - \mu_2 t_2}$$

In order to retrieve the original signal $I_1$ which should be present if the layer was not there, the following formulae applies:

$$I_1 = (I_3 \cdot I_0)/I_2 = \frac{I_0^2 (e^{-\mu_1 t_1} \cdot e^{-\mu_2 t_2})}{I_0 e^{-\mu_2 t_2}} = I_0 e^{-\mu_1 t_1}$$

This procedure should be implemented independently on both the high and low energy signals.

Figure 18:
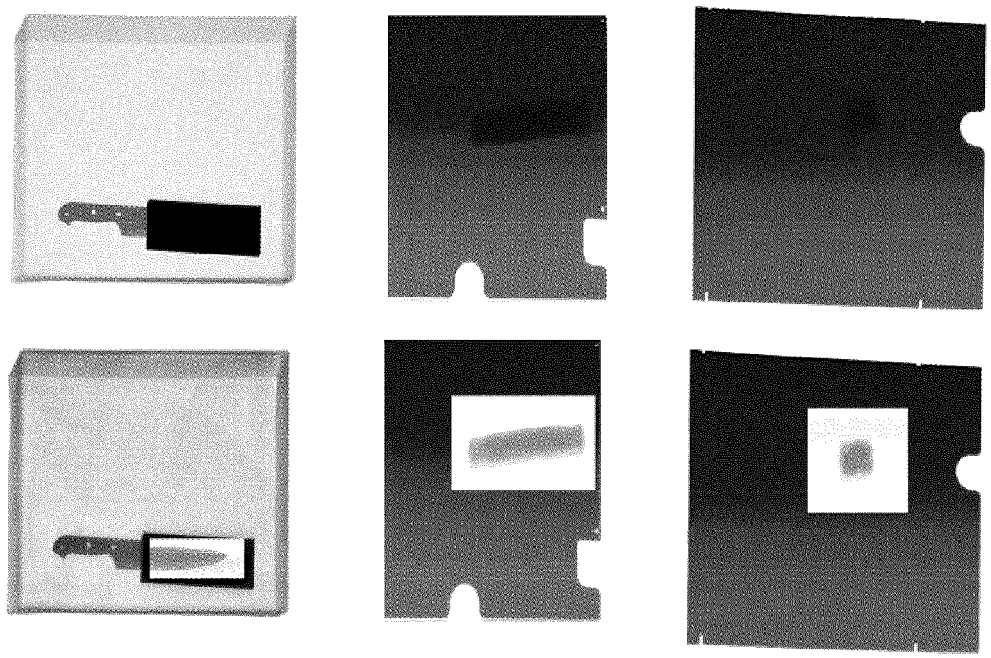
FIG. 18 shows images displayed further to a formatting by the the layer removal module.

Examples of resulting images are presented in FIG. 18.

Thus, using different wording, there is provided in accordance with an embodiment, a method for imaging an obstructed object in an image. The method comprises a step of receiving, via an input port (16, 20), a base image comprising pixels, each representing a captured signal from a source emitting a source signal $I_0$. Another step involves locating, by means of a locating module embedded in a processor 30, a region of interest in the base image wherein the pixels represent a combined signal $I_3$ having traversed the obstructed object and said obstructive layer. In another step, there is provided in a memory 12, a layer signal $I_2$ representing a signal having traversed the obstructive layer outside of said region of interest. A calculator (for example layer removal module 30) embedded in the processor 14, then isolates an original signal $I_1$ in said region of interest, by removing for each pixel in said region of interest, the layer signal $I_2$ from the combined signal $I_3$, on the basis of said source signal $I_0$. The resulting original signal $I_1$ represents an image of the obstructed object. The resulting image is then displayed on the display screen 22, in which the region of interest reveals the obstructed object. The isolation is performed as explained above based on the Beer-Lambert Law.

It is to be understood that any of the features of the above described components, including formatting modules 24, 26, 28, 30 (FIG. 1) may be combined together or with other image processing operational features or modules before or during the output of the image on the display screen 22, as can be understood by a person skilled in the art.

Worded differently, in accordance with embodiments, there is provided an image display system for displaying a base image showing a scanned object, the base image being composed of pixels each having a display value (which may correspond to a greyscale or color value), the system comprising:

an input port, at a processor, for receiving the base image and a display format selection;

a formatting module, integrated in the processor, for formatting the image according to the display format selection; and an output port, at the processor, for transmitting a formatted image to be displayed.

According to a particular embodiment, each pixel of the image is associated to an atomic number representing a composition of material. In this embodiment, the formatting module comprises a precious metal detection module adapted to receive a selection of a metal to be detected, to identify pixels of the image corresponding to the atomic number of the metal selected and to set the value of the identified pixels to a high-contrast color in relation to surrounding pixels, in order to high-light regions of the image corresponding to the selected metal.

Alternatively or additionally, the formatting module comprises a dynamic range variation module adapted to convert ranges of pixel values to spectrums of colors, in order to provide better contrast between neighboring areas in the image.

Alternatively or additionally, the formatting module comprises a sinusoidal color map module adapted to define regions of the image having similar pixel values and associating with each region a changing color scheme to be displayed in periodic variance, in order to further promote distinctions between neighboring areas corresponding to different compositions.

Alternatively or additionally, the formatting module comprises a layer removal module. In this embodiment, a background pixel value representing a background of the object having been scanned is predetermined. The layer removal module is adapted to identify pixels corresponding to the background pixel value and to set the identified pixels to a default value (for example, nil), so as to isolate the scanned object in the displayed image.

There may also be provided a method of displaying a base image showing a scanned object, the base image being composed of pixels each having a display value (which may correspond to a greyscale or color value), the method comprising:

for receiving, at a processor via an input port, the base image and a display format selection;

formatting the image according to the display format selection, via a formatting module, integrated in the processor; and transmitting, from an output port, a formatted image to be displayed.

In the context of the present description, the term "processor" refers to an electronic circuitry that can execute computer instructions, such as a central processing unit (CPU), a microprocessor, a controller, and/or the like. A plurality of such processors may be provided, according to embodiments of the present invention, as can be understood by a person skilled in the art. The processor may be provided within one or more general purpose computer, for example, and/or any other suitable computing device.

Still in the context of the present description, the term "storage" refers to any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or the like. A plurality of such storage devices may be provided, as can be understood by a person skilled in the art.

Embodiments of the present invention are advantageous in that distinctions between elements of a base image are enhanced on a display screen. A further advantage is that the composition of some of the elements may be more easily observed.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A method for detecting one or more user-selected types of metal material in an object, the method comprising:

receiving, via an input port, a base image of the object in which the one or more types of metal material are to be detected, the base image being composed of pixels, each pixel comprising energy absorption information;

providing in a memory, at least one reference value, each reference value representing an energy absorption of a reference metal material;

receiving, via a user input device, one or more user-selected types of metal material to be detected;

transforming the base image, by means of a material detection module embedded in a processor, by highlighting each of said pixels of which the energy absorption information correlates with the absorption information of the reference metal material stored in the memory corresponding to the one or more user-selected types of metal material, based on a comparison of the energy absorption information of each pixel of the base image with the at least one reference value stored in the memory, in order to produce a detection-enhanced image; and displaying, on a display screen, the detection-enhanced image having highlighted pixels corresponding to the one or more user-selected types of metal material.

2. A method according to claim 1, wherein the base image is generated by capturing a source emission having traversed the object and converting said source emission to a pixel value.

3. A method according to claim 2, wherein the source emission comprises X-Ray emission.

4. A method according to claim 2, wherein each of said at least one reference value is set for a given signal level of the source emission and wherein said comparison between the energy absorption information of each pixel of the base image with the at least one reference value in the transforming step, takes into account said signal level.

5. A method according to claim 4, wherein the source emission to which the object is subjected to, corresponds to said signal level.

6. A method according to claim 1, wherein the energy absorption information comprises an atomic number.

7. A method according to claim 1, wherein the energy absorption information of each pixel comprises a low energy absorption component and a high energy absorption component.

8. A method according to claim 7, wherein the low energy absorption and the high energy absorption components are converted into a corresponding grey scale value for the pixel.

9. A method according to claim 7, wherein the at least one reference value comprises a low energy reference value and a high energy reference value for each of said reference material and wherein said comparison between the energy absorption information of each pixel of the base image and the at least one reference value in the transforming step, comprises: comparing the low energy absorption information with the low energy reference value; and comparing the high energy absorption information with the high energy reference value.

10. The method according to claim 9, wherein said low energy reference value and the low energy absorption information correspond to an energy signal within a lower range spanning between about 10 kV to about 70 kV.

11. The method according to claim 9, wherein said high energy reference value and the high energy absorption information correspond to an energy signal within a higher range spanning between about 60 kV to about 250 kV.

12. The method according to claim 1, wherein the at least one reference metal material is a particular metal.

13. The method according to claim 1, wherein the at least one reference value represents energy absorptions of a plurality of said reference metal materials.

14. The method according to claim 1, wherein the highlighting step comprises coloring the pixel to be highlighted in a contrasting color, in relation to other pixels in the detection-enhanced image.

15. A non-transitory processor-readable storage medium for detecting one or more user-selected types of metal material in an object, the processor-readable storage medium comprising data and instructions for execution by a processor, to execute the steps of the method, in accordance with claim 1.

16. A system for detecting-a one or more user-selected types of metal material in an object, the system comprising:

an input port for receiving a base image of the object in which the one or more types of metal material are to be detected, the base image being composed of pixels, each pixel comprising energy absorption information;

a memory for providing at least one reference value, each reference value representing an energy absorption of a reference metal material;

a user input device for receiving one or more user-selected types of metal material to be detected;

a material detection module embedded in a processor, the processor being in communication with the input port and the memory, for transforming the base image by highlighting each of said pixels of which the energy absorption information correlates with the absorption information of the reference metal material stored in the memory corresponding to the one or more user-selected types of metal material, based on a comparison of the energy absorption information of each pixel of the base image with said at least one reference value stored in the memory, in order to produce a detection-enhanced image; and a display screen being in communication with the processor, for displaying the detection-enhanced image having highlighted pixels corresponding to the one or more user-selected types of metal material.

* * * * *